United States Patent [19]

Greenwood

[11] Patent Number: 4,679,646
[45] Date of Patent: Jul. 14, 1987

[54] DRIVELINE FOR REGENERATIVE BRAKING

[75] Inventor: Christopher J. Greenwood, Leyland, United Kingdom

[73] Assignee: Leyland Vehicles Limited, Leyland, United Kingdom

[21] Appl. No.: 588,656

[22] Filed: Mar. 12, 1984

[30] Foreign Application Priority Data

Mar. 15, 1983 [GB] United Kingdom ............... 8307059

[51] Int. Cl.$^4$ .............................................. B60K 9/00
[52] U.S. Cl. ................................... 180/165; 192/0.09; 192/48.6
[58] Field of Search .................... 180/165, 65.2; 192/0.082, 0.090, 4 A, 48.4, 48.6, 48.92; 74/572, 574

[56] References Cited

U.S. PATENT DOCUMENTS

| | | | |
|---|---|---|---|
| 3,749,194 | 7/1973 | Bardwick | 180/165 |
| 4,171,029 | 10/1979 | Beale | 180/54 R |
| 4,276,951 | 7/1981 | Smitley | 180/165 |
| 4,342,371 | 8/1982 | Smitley | 74/572 |
| 4,495,836 | 1/1985 | Cohen | 180/165 |

FOREIGN PATENT DOCUMENTS 0061276 9/1982 European Pat. Off. .
7727938 9/1977 France .
8021706 10/1980 France .

OTHER PUBLICATIONS

Nasa/Lewis, Electric Vehicle C.V.T., Evaluated Automotive Engineering, Sep. 1981, p. 84.

*Primary Examiner*—John J. Love
*Assistant Examiner*—Richard Camby
*Attorney, Agent, or Firm*—Hayes, Davis & Soloway

[57] ABSTRACT

A diesel engine (1) drives an axle (4) through a continuously-variable-ratio transmission (3), e.g. of the toroidal race rolling friction type. A flywheel system (5) is coupled to the input of the transmission (3) by reduction gearing (8, 9). Sprag clutches (2, 6) ensure that the transmission selects whichever is the faster of the engine or the flywheel, and a multiplate clutch (7) parallel with the flywheel sprag clutch (6) is engaged for regenerative braking. Parasitic losses during flywheel drive are reduced by operating the flywheel in a referred speed range coinciding with the engine speed range.

3 Claims, 1 Drawing Figure

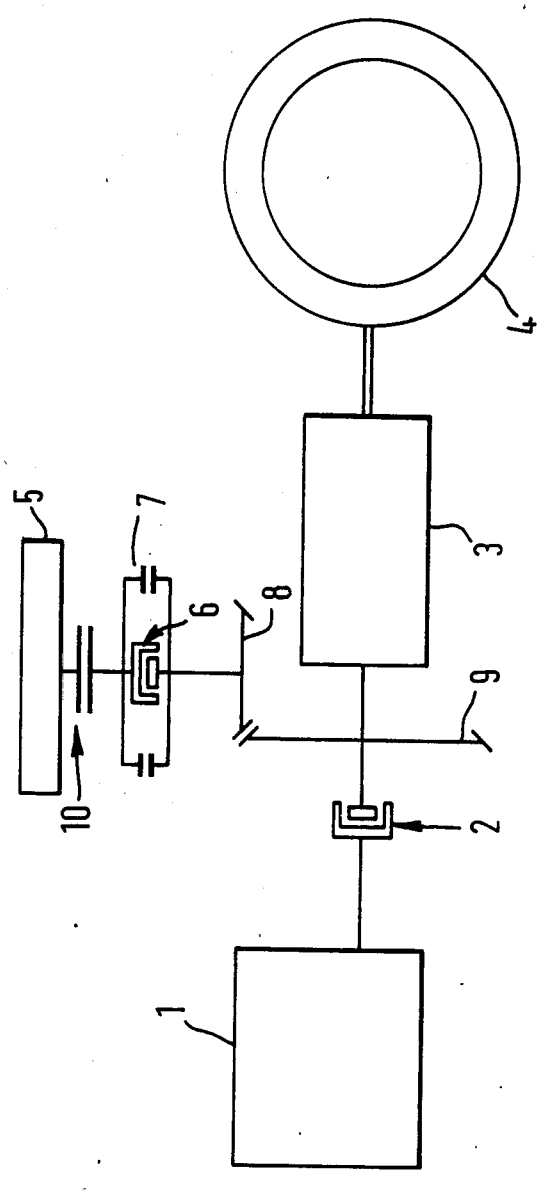

DRIVELINE FOR REGENERATIVE BRAKING

This invention relates to a driveline providing for regenerative braking of a vehicle. It is particularly concerned with a driveline making use of a continuously-variable-ratio transmission, with energy being stored in a flywheel, and is useful in heavy goods vehicles where heavy braking is required, and especially in public service vehicles which have to stop and start many times in a journey. Drivelines of this type are already known, but there have been considerable difficulties in the control of the engine and flywheel. One type of driveline is described in our copending UK patent application No. 2095188A. There the arrangement is such that the flywheel can only drive the transmission when the engine is not driving the transmission. A disadvantage of this driveline, however, is that because the referred flywheel speed range i.e. the range of speeds as measured at the transmission input, is above the maximum engine speed, there are high parasitic energy losses from the flywheel in the transmission when the vehicle is stationary after regenerative braking. These could be reduced by disconnecting the flywheel with a clutch as is proposed in that specification. However it would be difficult to make rapid re-engagement of the transmission acceptably smooth. Moreover, with the high flywheel speed in that driveline, parasitic transmission losses are heavy even during normal flywheel operation.

According to the present invention, a driveline for a vehicle comprises a continuously-variable ratio transmission, an engine for driving the transmission, a flywheel system for the regenerative braking of the vehicle, an engine clutch for coupling the engine to an input of the transmission only when its speed on the engine side would exceed that on the transmission side, a first flywheel clutch coupling the flywheel system to the transmission input only when its speed on the flywheel side would exceed that on the transmission side, and a second flywheel clutch operable in parallel with the first to couple the flywheel to the transmission input for regenerative braking. This driveline arrangement allows the referred flywheel speed to be reduced to an operating range within the engine speed range, i.e. the engine and flywheel speed ranges, at the transmission input, can be similar, and the flywheel drives the transmission at a lower speed than has hitherto been achieved with a driveline of this type. The engine clutch and the first flywheel clutch means are preferably over-running clutches.

The preferred driveline has a multiplate clutch as the second, parallel flywheel clutch controlled to engage when regenerative braking, i.e. braking of the vehicle by accelerating the flywheel through the transmission, is required.

For some purposes it is desirable to provide a further clutch to isolate the flywheel independently from the operation of the first and second parallel flywheel clutch means, enabling the flywheel to be released when charged but not required to drive.

In order that the invention may be better understood, a preferred embodiment will now be described, with reference to the accompanying drawing, which is a schematic representation of the driveline between an engine, a flywheel and a drive axle.

A diesel engine 1 drives an axle 4 through a continuously-variable ratio transmission 3, which in this example is of the toroidal race rolling traction type. The driveline from the engine 1 to the transmission input side is through an engine "sprag" clutch or over-running clutch 2. This clutch is only engaged when the speed on the transmission side of the clutch does not exceed the speed on the engine side.

A flywheel system 5 is coupled to the input side of the transmission 3 by way of: a flywheel disconnect clutch 10; a parallel combination of a "sprag" clutch 6 and a multiplate clutch 7; and connection gearing 8, 9. In this description, the "referred flywheel speed" is the speed of rotation of the gear 9 at the transmission input, when coupled to the flywheel system 5. The flywheel sprag clutch 6 is connected in the opposite direction to the flywheel sprag clutch disclosed in specification 2095188, referred to above. It transmit power only when the transmission input torque is such as to decelerate the flywheel. The multiplate clutch 7, or an alternative type of clutch, is clearly necessary for accelerating the flywheel through the transmission i.e. when regeneratively braking the vehicle.

There are certain parasitic losses even in the flywheel itself, and these could decelerate the flywheel to below its operational minimum speed. This is compensated for by transmitting engine power through the gearing 9, 8 and multiplate clutch 7. Unmodulated application of the clutch 7 to "top-up" the flywheel speed would not give a smooth drive. Therefore in this embodiment, the multiplate clutch 7 is "slipped" or modulated to give sufficient drive to overcome the losses. Julian Beale's U.S. Pat. No. 4,117,029, filed May 10, 1984, more fully discloses the hydraulic coupling and modulating aspects incorporated within this invention. Instead, for some applications, it would be sufficient to introduce an oil flow between the fully open clutch plates of an unmodulated multiplate clutch 7 to produce just sufficient viscous drag to overcome these parasitic losses. Such an oil flow has been used before to provide retarder cooling. This small energy flow, by slipping the clutch 7 or by introducing oil, effective during cruising, is referred to hereafter as the cruise control.

In this example, the engine is designed to operate between idle and its maximum speed of around 2000 rpm when driving the transmission. The referred flywheel speed is designed to lie in the range 1000 to 2000 rpm, within the engine speed range, and this substantially reduces the parasitic losses. The lower the minimum flywheel speed, the more efficient, the driveline, but the higher the maximum torque on the driveline for a given regenerative braking power; it is this torque which constrains the flywheel speed to being above a certain minimum.

The operation of the driveline will now be described for various driving situations.

(1) Start up: with the flywheel stationary. The engine is started and the transmission "selects" drive from only the engine, as it provides the faster input. The flywheel is accelerated to its minimum speed by the cruise control.

(2) Engine drive, with the flywheel exhausted. Operation of the engine above the referred flywheel speed always transfers drive to wheels from the engine, provided the multiplate clutch 7 has been disengaged. This normally occurs when the flywheel is exhausted, at or just below 1000 rpm, but can occur at higher flywheel speeds (see "kick down" operation, below). Conventional engine drive follows.

(3) Flywheel engagement for regenerative braking. A braking demand on the system is preceded by a zero throttle setting. The transmission operates to allow the engine speed to drop, eventually falling below the referred flywheel speed. At this point the flywheel sprag 6 engages, and this ensures that subsequent engagement of the multiplate clutch 7 is shock-free. At the point of speed equalization at sprag 6, an automatic monitoring system responds to the equality of the shaft speed on either side of the parallel flywheel cluth to engage the multiplate clutch 7. The transmission then produces an applied restraining torque, and regenerative braking commences by steadily downshifting ratio. Power is absorbed by the flywheel initially at a 1000 rpm referred speed (at a higher speed after "kick down") and up to a limit of around 2000 rpm. For a typical 16 ton bus this would represent an approximate capability of 0.1 g deceleration at 30 m.p.h.

(4) Flywheel driving, with engine idling. When the flywheel is charged above its minimum speed, energy is available for drive. The engine will then be left idling with its clutch 2 free wheeling. Since the transmission selects the faster, flywheel input by the action of the sprag clutches, the multiplate clutch 7 can be disengaged without interrupting drive. Reconnection to the engine 1 is achieved by accelerating it above the referred flywheel speed with clutch 7 open.

(5) Flywheel decoupling. As an optional feature, at any appropriate time during flywheel operation the flywheel can be disengaged independently of the parallel clutch arrangement 6, 7 by means of the flywheel disconnect clutch 10. This causes the transmission input shaft to decelerate and the engine sprag 2 eventually to engage. The flywheel can then only be re-engaged by the modulated application of the disconnect clutch 10, and this difficult operation can be assisted by the acceleration of the engine.

(6) Kick down. The normal transfer from flywheel to engine drive, described in section (4) above, occurs at or around 1000 rpm with the flywheel exhausted. The engine is thus engaged at the low speed of 1000 rpm and must accelerate to a higher speed appropriate to the power demanded by the transmission, during which time the driveline is "relaxed". For higher power demands, the engine takes a considerable time to reach the appropriate speed. This period of relaxation can be reduced by releasing the flywheel at a higher speed, before it is exhausted, and engaging the engine at this higher speed so that the required engine acceleration after engagement is reduced. The multiplate clutch 7 is thus disengaged earlier than normal for such a "kick down" operation. The energy still stored in the flywheel is then available when the demand is subsequently reduced. Kick down increases performance at the expense of fuel economy. The levels at which a control system permits kick down to be selected can be optimised.

(7) Low power strategy. The engine and flywheel can be operated together by keeping the multiplate clutch 7 engaged. Deriving energy from the flywheel, with the engine topping up as required, provides a more efficient driveline operation at low power demand. The disadvantage is that the flywheel operates at higher speeds, leaving little capacity for the absorption of power during regenerative braking. This low power strategy must therefore only be permitted by the control system, for a given vehicle speed, when the remaining flywheel capacity will be sufficient to store the vehicle's kinetic energy.

I claim:

1. A driveline for a vehicle, comprising a continuously-variable-ratio transmission, an engine for driving the transmission, a flywheel system for the regenerative braking of the vehicle, an engine clutch for coupling the engine to an input of the transmission only when its speed on the engine side would exceed that on the transmission side, a first flywheel clutch coupling the flywheel system to the transmission input only when it speed on the flywheel side would exceed that on the transmission side, and a second flywheel clutch parallel to the first, and operable to couple the flywheel to the transmission input for regenerative braking; wherein the second, parallel flywheel clutch comprises a multiplate clutch and control means for engaging the clutch when regenerative braking is required; the control means responds to the speeds on the flywheel side and on the transmission side to engage the multiplate clutch only when those speeds are equal and to disengage the clutch when the flywheel is to be disengaged.

2. A driveline for a vehicle, comprising a continuously-variable-ratio transmission, an engine for driving the transmission, a flywheel system for the regenerative braking of the vehicle, an engine clutch for coupling the engine to an input of the transmission only when its speed on the engine side would exceed that on the transmission side, a first flywheel clutch coupling the flywheel system to the transmission input only when its speed on the flywheel side would exceed that on the transmission side, and a second flywheel clutch parallel to the first, and operable to couple the flywheel to the transmission input for regenerative braking; comprising a further clutch in series with the first and second parallel clutch means, independently for disconnecting the flywheel from the transmission input, at any desired flywheel speed, the further clutch including means for modulating its re-engagement.

3. A driveline for a vehicle, comprising a continuously-variable-ratio transmission, an engine for driving the transmission, a flywheel system for the regenerative braking of the vehicle, an engine clutch for coupling the engine to an input of the transmission only when its speed on the engine side would exceed that on the transmission side, a first flywheel clutch coupling the flywheel system to the transmission input only when its speed on the flywheel side would exceed that on the transmission side, and a second flywheel clutch parallel to the first, and operable to couple the flywheel to the transmission input for regenerative braking; wherein control means responds to the speeds on the flywheel side and on the transmission side to engage a multiplate clutch only when those speeds are equal and to disengage the clutch when the flywheel is to be disengaged.

* * * * *